United States Patent
Mauri et al.

(10) Patent No.: US 7,151,653 B2
(45) Date of Patent: Dec. 19, 2006

(54) DEPOSITING A PINNED LAYER STRUCTURE IN A SELF-PINNED SPIN VALVE

(75) Inventors: Daniele Mauri, San Jose, CA (US); Alexander M. Zeltser, San Jose, CA (US)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 437 days.

(21) Appl. No.: 10/782,208

(22) Filed: Feb. 18, 2004

(65) Prior Publication Data

US 2005/0180112 A1    Aug. 18, 2005

(51) Int. Cl.
G11B 5/127    (2006.01)

(52) U.S. Cl. .................................. 360/324.11

(58) Field of Classification Search ........... 360/324.11, 360/324.1, 324.12, 324, 313; 29/603.01, 29/603.07, 603.13, 603.14
See application file for complete search history.

(56) References Cited

U.S. PATENT DOCUMENTS

| | | | |
|---|---|---|---|
| 5,465,185 A | 11/1995 | Heim et al. | 360/113 |
| 5,583,725 A | 12/1996 | Coffey et al. | 360/113 |
| 5,701,223 A | 12/1997 | Fontana, Jr. et al. | 360/113 |
| 5,920,446 A * | 7/1999 | Gill | 360/324 |
| 6,051,309 A | 4/2000 | Fujikata et al. | 428/332 |
| 6,127,053 A | 10/2000 | Lin et al. | 428/692 |
| 6,219,208 B1 | 4/2001 | Gill | 360/324.1 |
| 6,331,773 B1 | 12/2001 | Engel | 324/252 |
| 6,396,734 B1 | 5/2002 | Ishikawa et al. | 365/158 |
| 6,493,196 B1 | 12/2002 | Noma et al. | 360/324.11 |
| 6,548,114 B1 | 4/2003 | Mao et al. | 427/255.7 |
| 6,620,530 B1 | 9/2003 | Li et al. | 428/692 |
| 6,866,751 B1 * | 3/2005 | Gill et al. | 204/192.2 |
| 2002/0159199 A1 | 10/2002 | Gill | 360/314 |
| 2003/0179516 A1 | 9/2003 | Freitag et al. | 360/324.11 |
| 2005/0002129 A1 * | 1/2005 | Gill | 360/324.11 |
| 2006/0114622 A1 * | 6/2006 | Gill | 360/324.12 |

FOREIGN PATENT DOCUMENTS

JP    9-275233    10/1997

* cited by examiner

Primary Examiner—Allen Cao

(57) ABSTRACT

The pinned layer structure in a self-pinned spin valve is deposited using a DC aligning field. The deposition of each of the Reference and Keeper layer in the pinned layer occurs within two different polarity DC aligning fields. Thus, a first portion of the Reference layer is deposited with a DC alignment field of a first polarity, i.e., either positive or negative, and a second portion of the Reference layer is deposited in a DC alignment field of opposite polarity. The Keeper layer is similarly deposited, with a first portion of the Keeper layer deposited in a first polarity DC alignment field and the second portion deposited in the opposite polarity DC alignment field. By splitting the deposition of the Reference and Keeper layers into portions using DC aligning fields the pinned layer structure is highly repeatable while providing a good thickness uniformity of the structure.

16 Claims, 5 Drawing Sheets

DEPOSITING A PINNED LAYER STRUCTURE IN A SELF-PINNED SPIN VALVE

FIELD OF THE INVENTION

The present invention relates to a magnetoresistive spin valve sensor, and in particular to the manufacture of a self-pinned pinned layer with well defined magnetization and uniform thickness.

BACKGROUND

Computer systems typically use a magnetic disk drive for memory storage. As is well known, a magnetic disk drive includes a rotating magnetic disk, a slider that has write and read heads, a suspension arm above the rotating disk and an actuator arm. As the magnetic disk rotates, the slider rides on a cushion of air over the surface of the magnetic disk and writes and reads data on selected tracks on the magnetic disk. The data is written and read from the magnetic disk as field signals using a write head and read head, respectively.

One type of magnetic sensor that is currently used as a read head is known as a "spin valve" sensor. A spin valve sensor is typically a sandwiched structure consisting of two ferromagnetic layers separated by a thin non-ferromagnetic layer. One of the ferromagnetic layers is called the "pinned layer" because it is magnetically pinned or oriented in a fixed and unchanging direction. The pinned layer is sometimes a laminate of two ferromagnetic layers that are separated by a coupling layer. Magnetic pinning of the pinned layer is frequently accomplished using an adjacent antiferromagnetic (AFM) layer, commonly referred to as the "pinning layer," through exchange coupling. The pinning field generated by the antiferromagnetic layer should be greater than demagnetizing fields (about 200 Oe) at the operating temperature of the spin valve sensor (about 120° C.) to ensure that the magnetization direction of the pinned layer remains fixed during the application of external fields (e.g., fields from bits recorded on the disk).

The other ferromagnetic layer is referred to as the "free" or "unpinned" layer because the magnetization is allowed to rotate in response to the presence of external magnetic fields. The spin valve sensor provides an output which is dependent upon angle variation of the magnetizations between the free and pinned layers. Data recorded on a magnetic disk can be read because the external magnetic field (the signal field) causes a change in direction of magnetization in the free layer, which in turn causes a change in resistance of the spin valve and a corresponding change in the sensed current or voltage.

To achieve maximum amplitude linear response, the free and pinned layers of a spin valve must have well defined magnetization directions parallel and normal to the air bearing surface (ABS) of the slider, respectively. The magnetization of the free layer is typically set by abutted permanent magnets, which provide a longitudinal hard bias stabilization of the sensor parallel to the recording media surface. The magnetization of the pinned layer structure is conventionally established normal to the ABS during the antiferromagnetic anneal after the layers of the spin valve sensor have been deposited. The anneal "turns on" the exchange coupling between the antiferromagnetic pinning layer the pinned layer. The pinning direction of the pinned layer is determined by the direction of the magnetic field during cooling below the blocking temperature during the anneal process.

Another type of spin valve sensor uses a pinned layer that is self-pinned and therefore does not use an antiferromagnetic pinning layer. In a self-pinned sensor high coercivity or high uniaxial anisotropy due to magnetostriction of the pinned layer can be used to fix pinned layer magnetization normal to the ABS. Since self-pinned sensors do not have antiferromagnetic layers, some other means of setting the pinning direction of the pinned layer normal to the ABS is required.

The pinned layer structure in a self-pinned sensor can be comprised of a single high coercivity ferromagnetic layer, or in more advanced designs, a synthetic pinned layer is used comprised of two ferromagnetic layers, i.e. Keeper and Reference layers, which are antiferromagnetically coupled through a coupling or spacer layer. The coupling layer is usually comprised of Ru, but can be Ir, Rh, Os or their alloys. The ferromagnetic layer situated between the Cu spacer layer and the Ru spacer layer is referred to as the Reference layer. The other ferromagnetic layer situated between the Ru spacer layer and capping layer, or the Ru spacer layer and the seed layer is referred to as a Keeper layer in case of top and bottom spin valves, respectively. The thickness of the Ru spacer/coupling layer is selected to provide natural antiferromagnetic coupling between the spacer and Reference layers. The natural antiferromagnetic coupling strength has two maxima at about 4 Å Ru and 8 Å Ru, with coupling strength more than a factor of two higher for the case of 4 Å Ru. Thus, the effective coercivity or saturation field necessary to saturate the Keeper/Ru/Reference structure, is also more than a factor of two higher when the Ru thickness is approximately 4 Å. The high effective coercivity or saturation field of the Keeper/Ru/Reference structure is desirable to prevent performance degradation during sensor operation. It is also desirable for the pinned layer to have high intrinsic coercivity to prevent demagnetization during device fabrication or during sensor operation. A self-pinned sensor with a thin Ru spacer and high coercivity (>100 Oe) Keeper layer is referred to as coercivity pinned or hard pinned sensor to distinguish it from a magnetostriction pinned self-pinned sensor. The latter sensor's high effective magnetostriction of the Keeper/Ru/Reference structure, leads to a large magnetoelastic anisotropy in the lapped sensor, normal to the ABS.

When using a Ru spacer in the so called second peak, i.e., the Ru spacer is approximately 8 Å, a pinning direction normal to the ABS can be established by application of a large field after device fabrication. Magnetic fields typically achievable with conventional electromagnets, i.e., 2 Tesla or less, are adequate for this pinned layer setting operation. However in case of Ru spacers in the so called first peak, i.e., the Ru spacer is approximately 4 Å, the field required for magnetic saturation and setting of the pinned layer structure can exceed the maximum field provided by electromagnets. Thus some other means of establishing pinning direction are necessary in the case of the hard pinned sensor.

When available electromagnets do not allow pinned layer setting at the end of device fabrication, as it is often the case with hard pinned sensors, the pinned layers must be properly oriented during the deposition process itself, which can be accomplished by growing Keeper and Reference layers with well saturated magnetic moment in the as deposited state. The tools used to deposit magnetic sensors, allow application of a uniform magnetic field during deposition. This field is typically limited to about 100 Oe. In many systems, the application of the magnetic field during deposition causes an unacceptable non-uniformity in the thickness of the layers. Accordingly, the magnetic field applied during deposition is conventionally alternated in polarity at a large frequency, typically 25 Hz, i.e., an AC aligning field is used.

When growing a hard pinned structure the net coercivity of the deposited materials that evolves during the deposition process must be considered. In a "bottom" type spin valve, for example, the Keeper layer is deposited first. In some cases the Keeper layer has intrinsic coercivity below 100 Oe, so the alternating applied field can fully reverse its magnetization at every cycle. The same is true during the Ru spacer deposition. The Reference layer is deposited next and will orient itself anti-parallel to the Keeper layer. Due to this effect the net coercivity of the combined pinned layers will start to increase during the growth of the Reference layer. As the coercivity approaches 100 Oe, the applied field is no longer capable of saturating the pinned layer at each reversal and the pinned layer starts to demagnetize. As the coercivity increases further beyond 100 Oe, the pinned layers are permanently left in a partially demagnetized state, because the applied field is now too weak to affect the magnetization. As discussed above, even application of the largest fields from an electromagnet after deposition will not improve the pinned layer magnetic state in most cases with a thin Ru layer. Accordingly, for each hard pinned sensor, there is a critical thickness range in which the coercivity is comparable in size to the applied field. In cases where the Keeper layer coercivity is larger than 100 Oe, this critical thickness range occurs during deposition of the Keeper layer. The key to a well saturated pinned layer structure is, therefore, to carefully avoid field reversal during the critical thickness range. This constraint, in no way precludes achievement of an optimal thickness uniformity, as is discussed below.

In case of a thin Ru layer, e.g., approximately 4 Å, high coercivity or hard pinned self-pinned sensor, the use of an AC aligning field during deposition of the Keeper and Reference layers produces pinned layers whose magnetization is not saturated and whose field direction is hard to control. Accordingly, what is needed is an improved method of producing a pinned layer structure in a hard pinned self-pinned spin valve that provides a well defined magnetization state along with good thickness uniformity.

SUMMARY

In accordance with an embodiment of the present invention, the pinned layer structure in a hard pinned self-pinned spin valve is deposited using a sequence of DC aligning fields, where the deposition of each of the Reference and Keeper layer in the pinned layer structure occurs with two different polarities of DC aligning fields. By depositing the Reference and Keeper layers with two different DC polarities, the magnetic state in the pinned layer structure is highly repeatable while providing a good thickness uniformity of the structure.

In one embodiment of the present invention, a method includes depositing a free layer structure, depositing a spacer layer, such as Cu, and depositing a self-pinned pinned layer structure. The deposition of the pinned layer structure includes depositing a first portion of a Reference layer in a DC aligning field having a first polarity, and depositing a second portion of the Reference layer in a DC aligning field having a second polarity. The deposition of the pinned layer structure further includes depositing a first portion of a Keeper layer in a DC aligning field having third polarity, and depositing a second portion of the Keeper layer in a DC aligning field having a fourth polarity.

In another embodiment of the present invention, an apparatus includes a self-pinned spin valve, where the self-pinned spin valve comprises a free layer and a spacer layer, which may be, e.g., Cu, adjacent to the free layer. The spin valve further comprises a Reference layer adjacent to the spacer layer. The Reference layer has a first portion that was deposited with a first DC aligning field with a positive or a negative polarity and a second portion deposited with a second DC aligning field with an opposite polarity of the first DC aligning field. The spin valve includes a coupling layer, which may be, e.g., Ru, adjacent to the Reference layer and a Keeper layer adjacent to the spacer layer. The Keeper layer has a first portion deposited with a third DC aligning field with a positive or a negative polarity and a second portion deposited with a fourth DC aligning field with an opposite polarity to the third DC aligning field.

In yet another embodiment of the present invention, a method of depositing a self-pinned pinned layer structure includes depositing a first half of a Reference layer in a first DC aligning field having a positive or a negative polarity and depositing a second half of the Reference layer in a second DC aligning field having a polarity that is opposite to the polarity of the first DC aligning field. The method further includes depositing a first half of a Keeper layer in a third DC aligning field having a positive or negative polarity and depositing a second half of the Keeper layer in a fourth DC aligning field having a polarity that is opposite to the polarity of the fourth DC aligning field.

DETAILED DESCRIPTION

Figure 1:
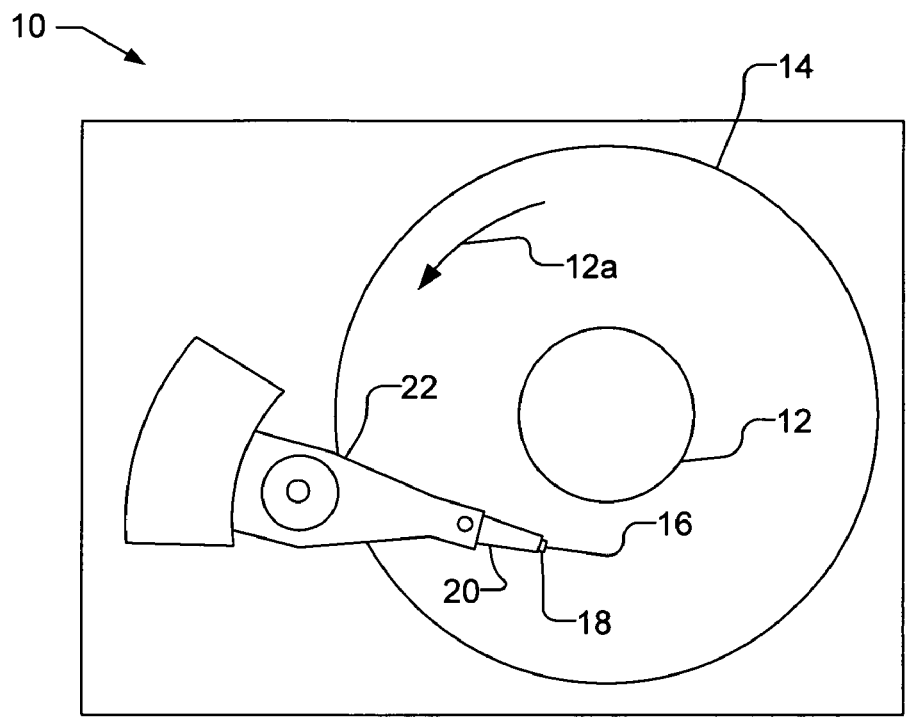
FIG. 1 illustrates a magnetic disk drive with which spin valve sensor manufactured in accordance with an embodiment of the present invention may be used.

FIG. 1 illustrates a magnetic disk drive 10 with which a self-pinned spin valve sensor manufactured in accordance with an embodiment of the present invention may be used. The drive 10 includes a spindle 12 that supports and rotates a magnetic disk 14. A combined read and write magnetic head assembly 16 is mounted on a slider 18 that is supported by a suspension 20 and an actuator arm 22. If desired, a plurality of disks, sliders and suspensions may be employed in a large capacity direct access storage device. The suspension 20 and actuator arm 22 position the slider 18 with the magnetic head assembly 16 in relation to the to the surface of the magnetic disk 14. When the disk 14 is rotated as indicated by arrow 12a, the slider 18 is supported on a thin (e.g., 0.05 µm) cushion of air (air bearing) between the surface of the disk 14 and the air bearing surface of the slider 18. The magnetic head assembly 16 may then be employed for writing information to multiple circular tracks on the surface of the disk 14, as well as for reading information there from.

Figure 2:
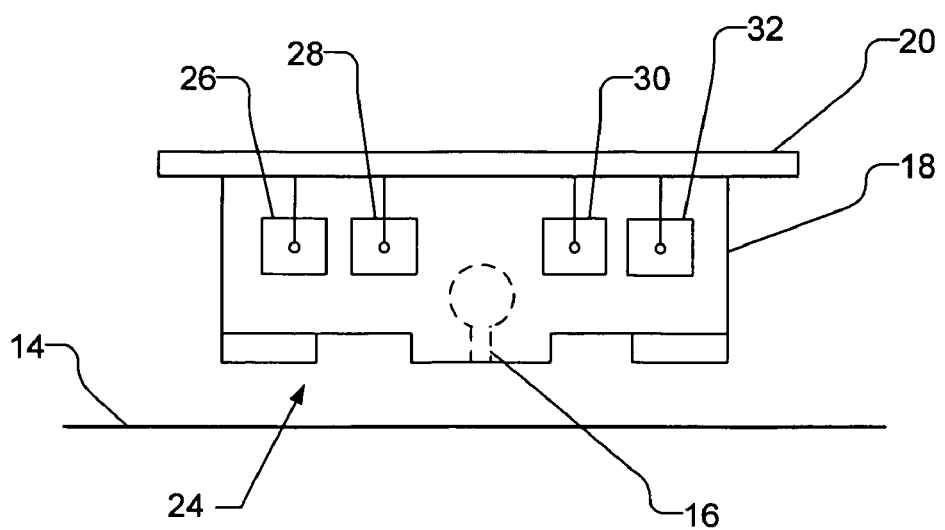
FIG. 2 shows an end view of a slider with a magnetic head assembly mounted on a suspension over the surface of a rotating magnetic disk.

FIG. 2 shows an end view of the slider 18 mounted on suspension 20 over the surface of the disk 14. As discussed above, the slider 18 is supported over the rotating disk 14 by an air bearing between the surface of the disk 14 and the air bearing surface 24 of the slider 18. As illustrated in FIG. 2, the magnetic head assembly 16 is mounted at the end of the slider 18 along with solder connections 26, 28, which connect leads from the write element of the magnetic head assembly 16 to leads on the suspension 20 (not shown), and solder connections 30, 32, which connect leads from the read element (i.e., the spin valve sensor) of the magnetic head assembly 16 to leads on the suspension 2 (not shown).

Figure 3:
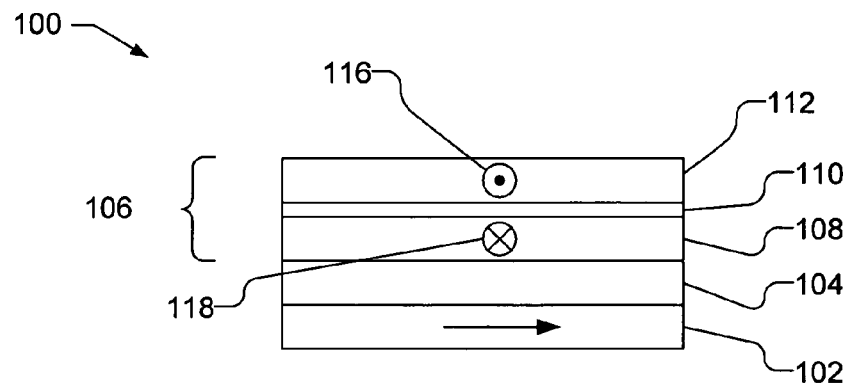
FIG. 3 illustrates an example of a self-pinned spin valve sensor that may be manufactured in accordance with an embodiment of the present invention.

FIG. 3 illustrates an example of a self-pinned spin valve sensor 100, such as the type that may be manufactured in accordance with an embodiment of the present invention. The self-pinned spin valve sensor 100 includes a ferromagnetic free layer 102 that is adjacent to a nonmagnetic electrically conducting spacer layer 104, which is adjacent to a pinned layer structure 106. The term "adjacent" as used herein is intended to indicate physical proximity between layers and that the "adjacent" layers may be in physical contact or they may have one or more intervening layers disposed there between. As is well known in the art, the ferromagnetic free layer 102 may be manufactured from materials such as nickel, cobalt, or iron or an alloy of such materials, and the spacer layer 104 is conventionally manufactured from copper. As is well known, the free layer 102 may be comprised of a more than one layer of ferromagnetic material.

The pinned layer structure 106 is a laminate of two ferromagnetic layers 108 and 112 and a nonmagnetic coupling layer 110 disposed there between. The two ferromagnetic layers 108, 112, sometimes referred to as the Reference layer and Keeper layer, respectively, have their magnetization directions oriented antiparallel, as indicated by the arrows 116 and 118 (arrows pointing out of and into the plane of the paper respectively), and thus, pinned layer structure 106 is referred to as an antiparallel (AP) pinned layer. The Reference and Keeper layers may be manufactured from ferromagnetic materials such as cobalt and iron or an alloy thereof, e.g., the Reference layer 108 may be approximately 25 Å of Co 10% Fe and the Keeper layer 112 may be approximately 20.9 Å of Co 50% Fe. The coupling layer may be, e.g., 3.5Å of Ruthenium (Ru).

It should be understood that the structure of self-pinned spin valve sensors are well known in the art and need not be described in detail herein. For example, the types of materials used to produce a spin valve sensor, the thickness of the layers, as well as manufacturing techniques to produce a conventional spin valve sensor are well known. Further, while not shown in FIG. 3, it is well known that self-pinned spin valves typically include several additional layers and structures, such as a seed layer and capping layers, as well as adjacent hard bias and lead layers and gap and shield layers, which are all well known in the art.

Conventionally, when the pinned layer structure 106 is deposited using static (i.e., the wafer is held stationary relative to the target) physical vapor deposition (PVD), an alternating current (AC) aligning field is used. The use of an AC aligning field provides a well-aligned uniaxial anisotropy and uniformity in the layer thickness. The use of an AC aligning field, however, provides a poorly defined pinning direction.

Figure 4:
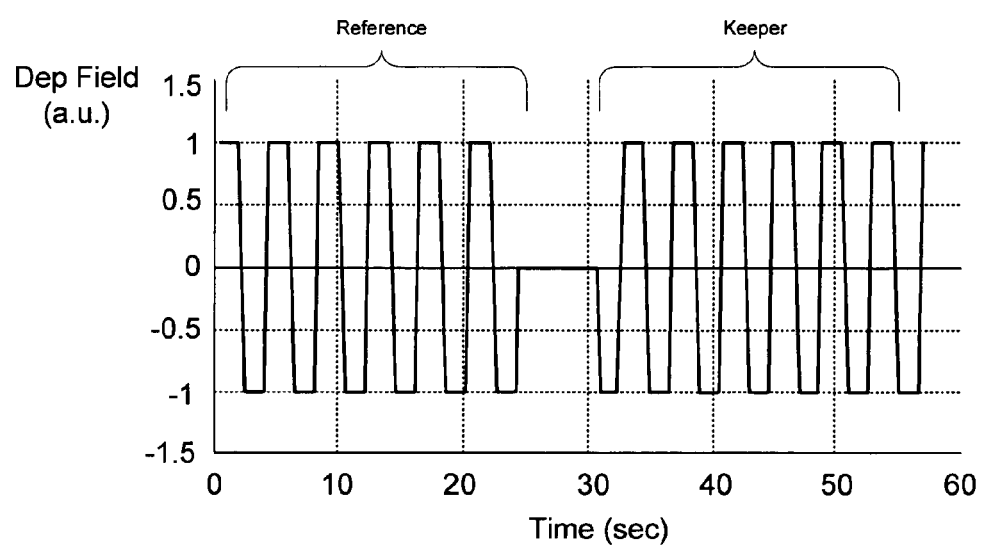
FIG. 4 is a graph schematically illustrating the aligning fields vs. time during a conventional AC field deposition of the Reference and Keeper layers.

FIG. 4 is a graph schematically illustrating the aligning magnetic field vs. time during a conventional AC field deposition of the Reference and Keeper layers 108, 112. The field in FIG. 4 has a switching frequency of 0.25 Hz (period 4 sec), which provides adequate thickness uniformity for the Reference and Keeper layers 108, 112. The magnetic field is held at 0 during the deposition of the nonmagnetic coupling layer 110, which is, e.g., ruthenium (Ru) between the deposition of the Reference and Keeper layers. As can be seen in FIG. 4, the deposition times of both the Reference and Keeper layers 108 and 112 during a conventional deposition is approximately 20 to 25 seconds, in which time the AC aligning field switches several times.

Figure 5:
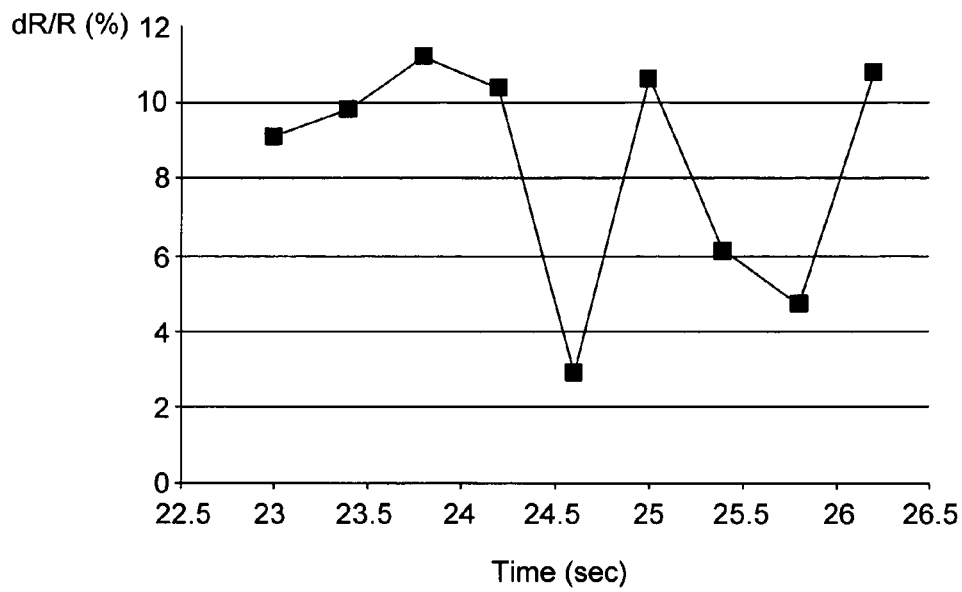
FIG. 5 is a graph illustrating the magnetoresistive coefficient dR/R, as a percentage versus the deposition time of the Keeper layer for a number of samples when the full Reference and Keeper layers were deposited using a conventional AC field method, such as that illustrated in FIG. 4.

FIG. 5 is a graph illustrating the magnetoresistive coefficient dR/R, as a percentage versus the deposition time of the Keeper layer 112 in several samples when the full Reference and Keeper layers 108, 112 were deposited using a conventional AC field method, such as that illustrated in FIG. 4. The conventional AC field method produces a highly non-repeatable magnetic state in the pinned layer structure that is manifested in a large variation of the magnetoresistive coefficient dR/R, e.g., from approximately 3% to 11%, depending on the magnetic state of the pinned layer structure when "frozen in" in the as-deposited stack.

To produce a highly repeatable magnetic state in the pinned layer structure, a self-pinned spin valve sensor is produced with the deposition of the pinned layer structure in a static direct current (DC) magnetic field.

Figure 6:
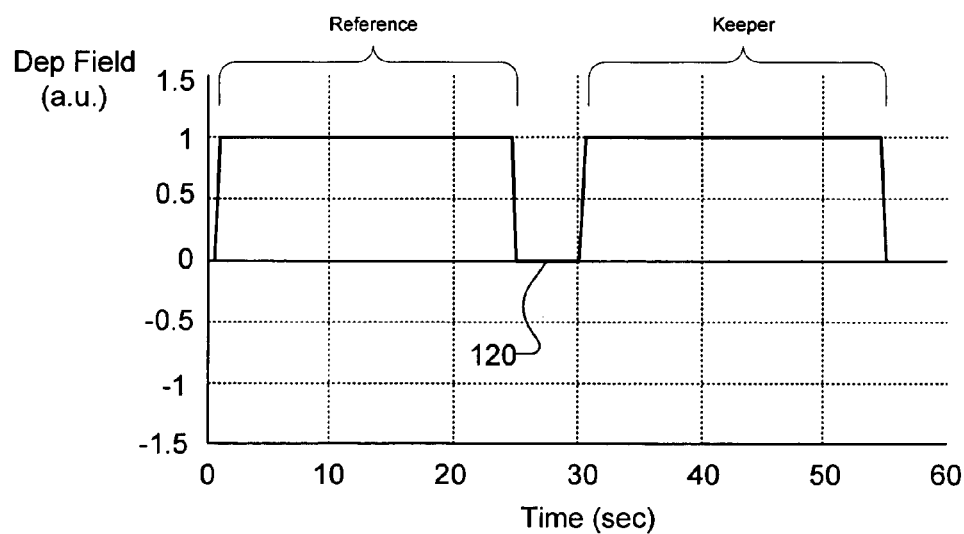
FIG. 6 is a graph schematically illustrating the DC aligning fields vs. time during deposition of the Reference and Keeper layers.

FIG. 6 is a graph schematically illustrating static DC aligning fields vs. time that is used during deposition of the Reference and Keeper layers 108, 112. By way of example, a static physical vapor deposition (PVD) tool, manufactured, e.g., by Veeco may be used to deposit the Reference layer 108 and Keeper layer 112. In one embodiment, during the period illustrated by area 120 of the curve the Ru coupling layer 110 is produced with no aligning field.

Figure 7:
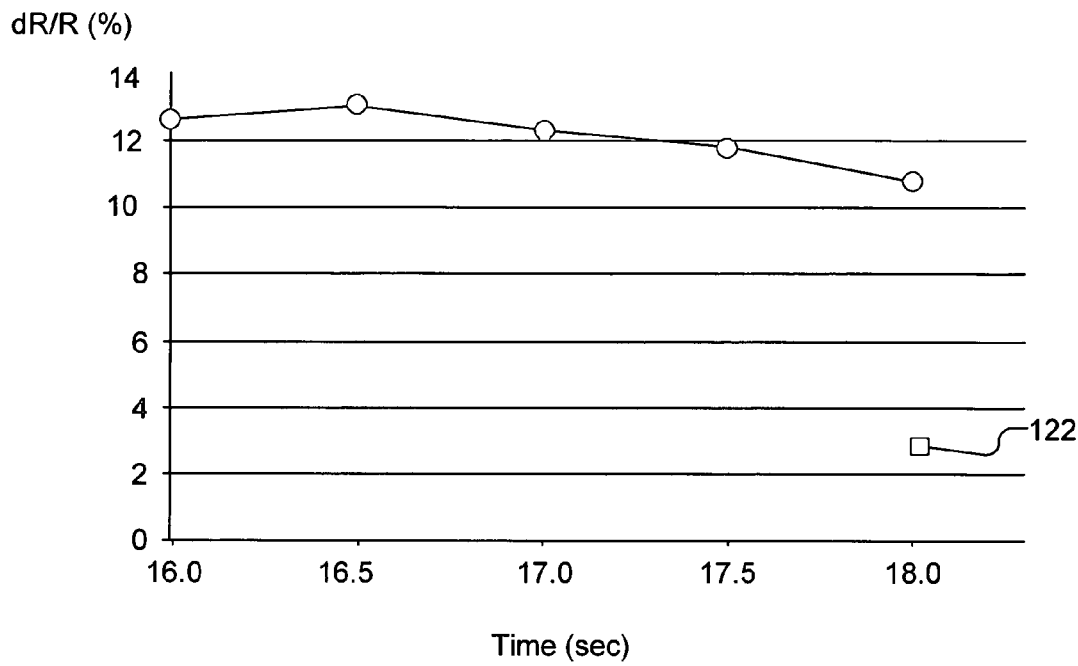
FIG. 7 is a graph illustrating the magnetoresistive coefficient dR/R, as a percentage, versus the deposition time of the Cu spacer layer for a number of samples when the full Reference and Keeper layers are deposited using a DC aligning field, such as that illustrated in FIG. 6.

FIG. 7 is a graph illustrating the magnetoresistive coefficient dR/R, as a percentage, versus the deposition time of the Cu spacer layer 104 in several samples when the full Reference and Keeper layers 108, 112 are deposited using a DC aligning field, such as that illustrated in FIG. 6. As can be seen in FIG. 7, when the entire Reference and Keeper layers are deposited in a DC aligning field, a repeatable magnetic state of the pinned layer is created, which is manifested in relatively consistent and high magnetoresistive coefficient that varies between 11% and 13% depending on the thickness of the Cu spacer layer 104. For the sake of comparison, the data point 122 is the magnetoresistive coefficient dR/R for a device with the Reference and Keeper layers deposited in a conventional AC aligning field.

It should be understood that either a positive or a negative DC aligning field may be used during deposition of the Reference and Keeper layers. Table 1 below illustrates that the deposition of the Keeper and Reference layers in a DC aligning field with different field orientation, i.e., positive (P) or negative (N) consistently produces the magnetoresistive coefficient dR/R of 11.7% to 11.9% at the coupon level, while coupons produced by depositing the Reference and Keeper layers in conventional AC aligning fields result in a magnetoresistive coefficient dR/R of 2.8%.

TABLE 1

| ID# | Polarity | Mag Field | DR/R |
|---|---|---|---|
| 1 | | AC | 2.84 |
| 3 | N | DC | 11.75 |
| 4 | P | DC | 11.92 |

Thus, deposition using a DC aligning field (as shown in FIG. 6) of the entire Reference and Keeper layers 108 and 112 in the pinned layer structure 106 produces a pinned layer structure with a well defined magnetic state. This method of deposition also causes the thicknesses of the Reference and Keeper layers 108 and 112 to be non-uniform.

Thus, in accordance with another embodiment of the present invention, the deposition of each of the Reference and Keeper layers is performed using a DC aligning field for different portions of each layer in the pinned layer structure. By way of example, the first portion of the Reference layer 108 is deposited with a positive DC aligning field and the second portion of the Reference layer 108 is deposited in a negative DC aligning field. The Keeper layer 112 is deposited in the same manner, i.e., the first portion of the Keeper layer 112 is deposited with a positive DC aligning field and the second portion of the Keeper layer 112 is deposited in a negative DC aligning field.

Figure 8:
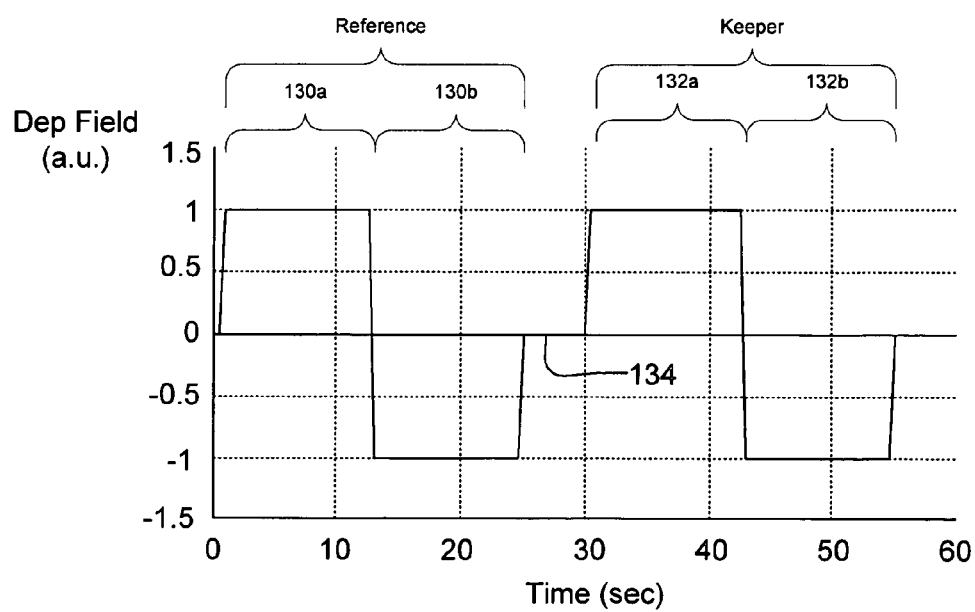
FIG. 8 is a graph schematically illustrating the split DC aligning fields vs. time during deposition of the Reference and Keeper layers.

FIG. 8 is a graph schematically illustrating the split DC aligning fields vs. time during deposition of the Reference and Keeper layers 108, 112. As can be seen, during a first period 130a the first portion of the Reference layer 108 is deposited in a positive DC aligning field and during a second period 130b, the second portion of the Reference layer 108 is deposited in a negative DC aligning field. Similarly, a during a first period 132a, the first portion of the Keeper layer 112 is deposited in a positive DC aligning field and during a second period 132b, the second portion of the Keeper layer 112 is deposited in a negative DC aligning field. In between the deposition of the Reference layer 108 and the Keeper layer 112, the Ru coupling layer 110 is deposited with no aligning field, as indicated at point 134 in the graph.

It should be understood, that if desired, the order of the polarity of the DC aligning field may be varied. Thus, for example, if desired, the first portion of the Reference layer 108 and/or the Keeper layer 112 may be deposited in a negative DC aligning field. Moreover, it should be understood that the order of deposition of the Reference and Keeper layers may be switched, e.g., to produce a bottom pinned layer structure.

Figure 9:
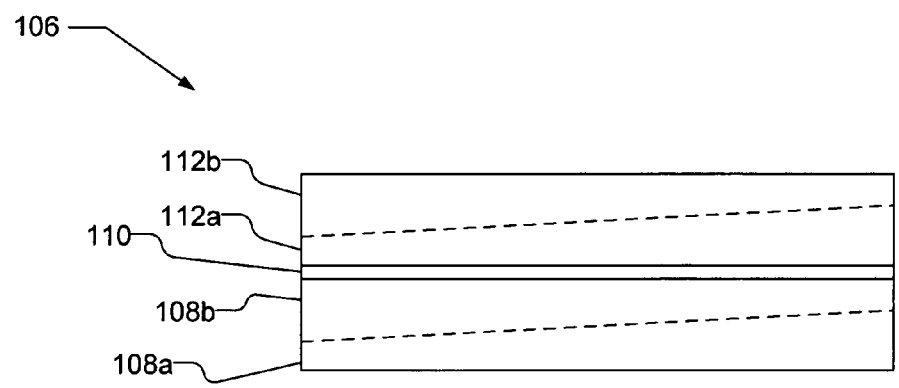
FIG. 9 illustrates a pinned layer structure in which the Keeper and Reference layers have been deposited in two portions: a first portion being deposited in a DC aligning field of a first polarity, and a second portion being deposited in a DC aligning field of an opposite polarity.

Dividing the Reference layer 108 and the Keeper layer 112 into two portions and using opposite polarity DC aligning fields during the deposition of each portion improves thickness uniformity. FIG. 9 illustrates a pinned layer structure 106 in which the Reference layer 108 has been deposited in two portions: a first portion 108a being deposited in a DC aligning field of a first polarity, and a second portion 108b being deposited in a DC aligning field of a second polarity. The Keeper layer 112 similarly is deposited in a first portion 112a in a DC aligning field of a first polarity and a second portion 112b in a DC aligning field of a second polarity. As illustrated by the broken lines in FIG. 9, any single portion has a relatively non-uniform thickness. However, by depositing approximately one half of each layer in one DC polarity and the other half of the layer in an opposite DC polarity, the resulting full layer has an approximately uniform thickness.

Table 2 shows that a 1σ thickness uniformity of the a test layer improves from about 4.5–4.7% when the full layer is deposited with a single polarity DC field, to about 0.5–0.6% when each layer is split in two half layers, each DC deposited with opposite polarity.

TABLE 2

| ID# | Single Layer | Time (sec) | DC | Time (sec) | DC | Rs | σ |
|---|---|---|---|---|---|---|---|
| 1 | Full | 300 | N | | | 5.93 | 4.46 |
| 2 | Split | 150 | N | 150 | P | 5.62 | 0.53 |
| 3 | Full | 300 | P | | | 5.18 | 4.72 |
| 4 | Split | 150 | P | 150 | N | 5.08 | 0.57 |

Figure 10:
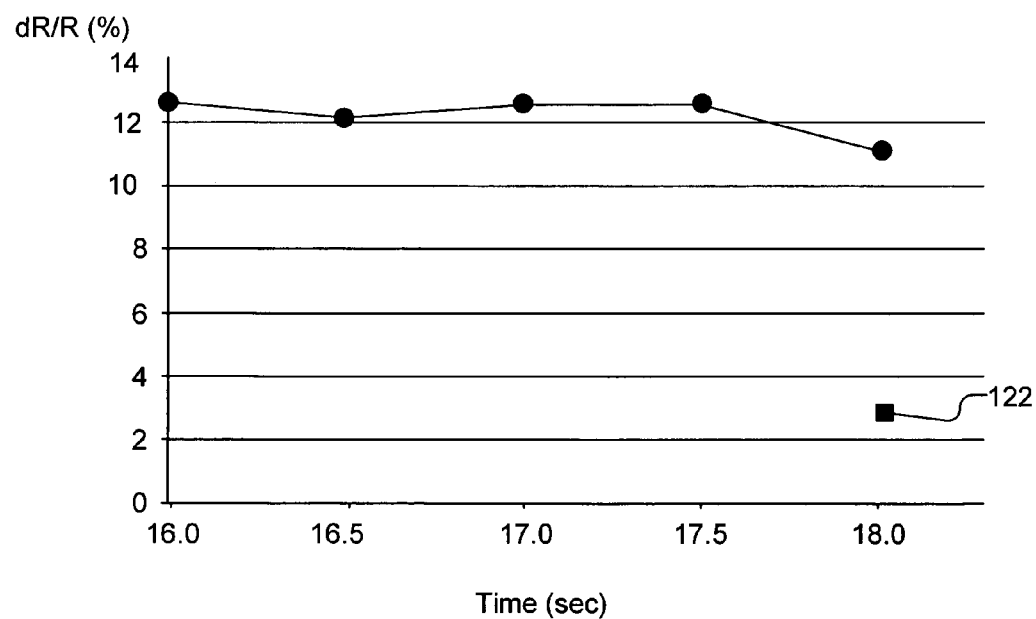
FIG. 10 illustrates the magnetoresistive coefficient dR/R, as a percentage, versus the deposition time of the Cu spacer layer for a number of samples when the Reference and Keeper layers are deposited using split DC aligning fields, such as that illustrated in FIG. 8.

Additionally, splitting the deposition of the Reference and Keeper layers 108 and 112 with two opposite polarities of a DC aligning field, results in a structure with a high, and consistent magnetoresistive coefficient dR/R. FIG. 10 illustrates the magnetoresistive coefficient dR/R, as a percentage, versus the deposition time of the Cu spacer layer 104 in several coupons when the Reference and Keeper layers 108, 112 are deposited using split DC aligning fields, such as that illustrated in FIG. 8.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
   depositing a free layer structure;
   depositing at least one spacer layer;
   depositing a self-pinned pinned layer structure, wherein depositing a pinned layer structure comprises:
      depositing a first portion of a Reference layer in a DC aligning field having a first polarity;
      depositing a second portion of the Reference layer in a DC aligning field having a second polarity;
      depositing a first portion of a Keeper layer in a DC aligning field having third polarity; and
      depositing a second portion of the Keeper layer in a DC aligning field having a fourth polarity.

2. The method of claim 1, wherein the first polarity is opposite the second polarity and the third polarity is opposite the fourth polarity.

3. The method of claim 1, wherein the first polarity is the same as the third polarity and the second polarity is the same as the fourth polarity.

4. The method of claim 1, wherein depositing the pinned layer structure further comprises depositing at least one coupling layer between the second portion of the Reference layer and the first portion of the Keeper layer.

5. The method of claim 1, wherein the free layer and the spacer layer are deposited before the pinned layer structure.

6. The method of claim 1, wherein the first portion of the Reference layer is the first half of the Reference layer and the second portion of the Reference layer is the second half of the Reference layer.

7. The method of claim 1, wherein the first portion of the Keeper layer is the first half of the Keeper layer and the second portion of the Keeper layer is the second half of the Keeper layer.

8. An apparatus comprising a spin valve sensor, the spin valve sensor comprising:
 a free layer structure;
 a spacer layer adjacent to the free layer structure;
 a self-pinned pinned layer structure adjacent to the spacer layer, the pinned layer structure comprising:
  a Reference layer having a first portion deposited with a first DC aligning field with one of a positive and a negative polarity and a second portion deposited with a second DC aligning field with an opposite polarity of the first DC aligning field;
  a coupling layer adjacent to the Reference layer; and
  a Keeper layer adjacent to the coupling layer, the Keeper layer having a first portion deposited with a third DC aligning field with one of a positive and negative polarity and a second portion deposited with a fourth DC aligning field with an opposite polarity to the third DC aligning field.

9. The apparatus of claim 8, wherein the first portion of the Reference layer is the first half of the Reference layer and the second portion of the Reference layer is the second half of the Reference layer.

10. The apparatus of claim 8, wherein the first portion of the Keeper layer is the first half of the Keeper layer and the second portion of the Keeper layer is the second half of the Keeper layer.

11. The apparatus of claim 8, wherein the Reference layer is adjacent to the spacer layer.

12. The apparatus of claim 8, wherein the apparatus is a magnetic head assembly.

13. A method of depositing a self-pinned pinned layer structure, the method comprising:
 depositing a first half of a Reference layer in a first DC aligning field having one of a positive and negative polarity;
 depositing a second half of the Reference layer in a second DC aligning field having a polarity, that is opposite the polarity of the first DC aligning field;
 depositing a first half of a Keeper layer in a third DC aligning field having one of a positive and negative polarity; and
 depositing a second half of the Keeper layer in a fourth DC aligning field having a polarity that is opposite the polarity of the fourth DC aligning field.

14. The method of claim 13, wherein the first DC aligning field and the third DC aligning field have the same polarity.

15. The method of claim 13, further comprising depositing a coupling layer between the Reference layer and the Keeper layer.

16. The method of claim 13, wherein the Reference layer is deposited before the Keeper layer.

* * * * *